United States Patent
Harada et al.

(10) Patent No.: US 6,803,675 B2
(45) Date of Patent: Oct. 12, 2004

(54) SLOT MECHANISM AND SMART IGNITION SYSTEM

(75) Inventors: Shoichi Harada, Aichi (JP); Tomoyuki Funayama, Toyota (JP); Hiroyuki Yamada, Toyota (JP); Yoshinori Fukuoka, Toyota (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 10/699,896

(22) Filed: Nov. 3, 2003

(65) Prior Publication Data

US 2004/0129042 A1 Jul. 8, 2004

(30) Foreign Application Priority Data

Nov. 8, 2002 (JP) ........................................ 2002-325828

(51) Int. Cl.[7] ................................................ B60R 1/00
(52) U.S. Cl. ...................................... 307/10.3; 180/287
(58) Field of Search ............................... 307/10.1–10.6; 180/287; 70/252

(56) References Cited

U.S. PATENT DOCUMENTS 5,801,614 A * 9/1998 Kokubu ................... 340/425.5
6,260,651 B1 * 7/2001 Kokubu et al. ............ 180/287

FOREIGN PATENT DOCUMENTS

| JP | 2001-130381 A | 5/2001 |
| JP | 2001-132289 A | 5/2001 |

* cited by examiner

Primary Examiner—Gregory J. Toatley, Jr.
(74) Attorney, Agent, or Firm—Crompton, Seager & Tufte, LLC

(57) ABSTRACT

A holder coil spring is located between an inner surface of a bottom of a case main body and a bottom outer surface of a shutter holder. A shutter coil spring is located between a bottom inner surface of the shutter holder and a shutter. In each sidewall of the shutter holder, a tactile feedback piece and a locking piece are provided. The tactile feedback piece holds the shutter holder at the case main body. The locking piece locks an electronic key in the shutter holder. Even if an object other than the electronic key (for example, a finger) is inserted in the slot, the object is not locked in the shutter holder. When the object other than the electronic key is pulled out of the slot, the shutter holder and the shutter return to original positions to close the slot. Therefore, when no object is inserted, the slot of the slot mechanism is reliably closed with the shutter.

20 Claims, 11 Drawing Sheets

SLOT MECHANISM AND SMART IGNITION SYSTEM

BACKGROUND OF THE INVENTION

The present invention relates to a slot mechanism for an electronic key used in a vehicle such as an automobile, and to a smart ignition system. Specifically, the present invention relates to a slot mechanism that has a shutter for closing a slot when no object is inserted in the slot, and to a smart ignition system that has such a slot mechanism.

In recent years, there is a demand for an improved operability of vehicles in addition to demands for improved basic performances and safety of vehicles. Smart ignition systems are known as one example of means for improving vehicle operability. When using a vehicle equipped with a smart ignition system, a user carries an electronic key when getting on the vehicle. The smart ignition system permits the user to start or stop the engine by simply manipulating a switch provided in the vehicle.

A smart ignition system performs an ID verification between an electronic key and a vehicle through wireless communications. When the ID code of the electronic key matches the ID code of the vehicle, the engine is permitted to be started. Japanese Laid-Open Patent Publications No. 2001-130381 and No. 2001-132289 disclose a technology in which an ID verification between an electronic key and a vehicle is executed with the electronic key inserted in a slot mechanism provided in an instrument panel. The devices disclosed in the publications each have a retaining mechanism for retaining the electronic key in the slot mechanism such that the electronic key does not come off the slot mechanism.

Typically, the slot of a slot mechanism for receiving an electronic key is larger than a slot for receiving a mechanical key. A slot mechanism, which has a relatively large slot, preferably has a shutter for closing the slot when no electronic key is inserted, so that foreign matter such as dust and dirt does not enter the interior of the slot mechanism.

The following points need to be noted when providing a slot mechanism with a shutter. The shutter must not hinder an electronic key from being held in the slot mechanism. Also, the shutter must be configured to reliably close the slot when the electronic key is removed from the slot. Further, the shutter must be configured to, after being pushed open with an object other than the electronic key, for example, with a finger, reliably close the slot. However, the conventional slot mechanisms fail to satisfactorily cater to these needs.

SUMMARY OF THE INVENTION

Accordingly, it is an objective of the present invention to provide a slot mechanism and a smart ignition system that reliably close a slot with a shutter when no object is inserted in the slot.

To achieve the above objective, the present invention provides a slot mechanism. The slot mechanism has an accommodation space into which an insertion object is inserted through a slot. The slot mechanism includes a shutter holder provided in the accommodation space. The shutter holder is movable between a first position and a second position along an insertion direction in which the insertion object is inserted into the accommodation space. The second position is closer to a bottom of the accommodation space than the first position. A shutter is provided in a shutter space defined in the shutter holder. The shutter is movable relative to the shutter holder and between a third position and a fourth position along the insertion direction. The fourth position is closer to a bottom of the shutter space than the third position. When the insertion object is inserted into the accommodation space, the shutter is pressed by the insertion object and is moved to the fourth position. The shutter holder is pressed by the shutter moved to the fourth position and is moved to the second position. When the insertion object is pulled out of the accommodation space, the shutter holder moves to the first position, and the shutter moves to the third position, so that the slot is closed by the shutter. The slot mechanism includes an insertion object locking mechanism. The locking mechanism locks the insertion object to the shutter holder when the shutter is moved to the fourth position by the insertion object. The slot mechanism includes a holder retaining mechanism. The holder retaining mechanism holds the shutter holder at the second position when the shutter holder is moved to the second position by the shutter.

According to another aspect of the invention, a smart ignition system that includes a portable device and a slot mechanism is provided. The slot mechanism has an accommodation space into which the portable device is inserted through a slot. The smart ignition system includes a detection portion for detecting insertion of the portable device into the accommodation space and a verification portion for determining whether the inserted portable device is a correct portable device. The slot mechanism includes a shutter holder provided in the accommodation space. The shutter holder is movable between a first position and a second position along a direction in which the portable device is inserted into the accommodation space. The second position is closer to a bottom of the accommodation space than the first position. A shutter is provided in a shutter space defined in the shutter holder. The shutter is movable relative to the shutter holder and between a third position and a fourth position along the insertion direction. The fourth position is closer to a bottom of the shutter space than the third position. When the portable device is inserted into the accommodation space, the shutter is pressed by the portable device and is moved to the fourth position. The shutter holder is pressed by the shutter moved to the fourth position and is moved to the second position. When the portable device is pulled out of the accommodation space, the shutter holder moves to the first position, and the shutter moves to the third position, so that the slot is closed by the shutter. A portable device locking mechanism locks the portable device to the shutter holder when the shutter is moved to the fourth position by the portable device. A holder retaining mechanism holds the shutter holder at the second position when the shutter holder is moved to the second position by the shutter.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of the present invention will now be described with reference to FIGS. 1 to 15.

Figure 2:
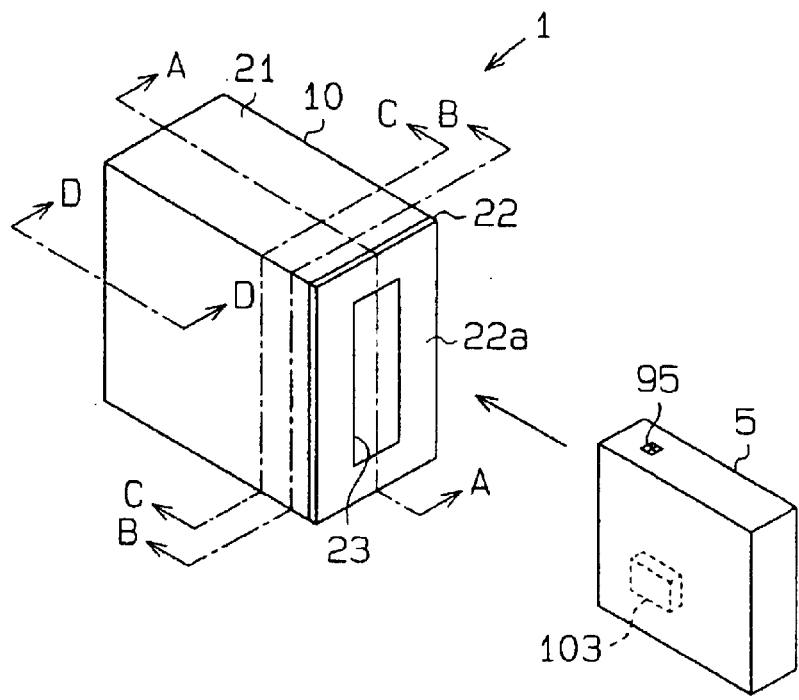
FIG. 2 is a perspective view illustrating the slot mechanism of FIG. 1 and an electronic key.

As shown in FIG. 2, an electronic key 5 is inserted into a slot mechanism 1. The electronic key 5 is held by a case 10 of the slot mechanism 1.

As shown in FIGS. 1 to 4, the slot mechanism 1 includes the case 10, a shutter holder 11, and a shutter 12.

The case 10 includes a case main body 21 and a panel portion 22. The panel portion 22 is attached to an opening of the case main body 21. The case 10 is shaped like a box.

The case main body 21 has a rectangular cross-section and a closed end. Recesses 31 are formed in the outer walls of the case main body 21. The recesses 31 extend from the open end of the case main body 21 toward the bottom of the case main body 21. A projection 31a is formed on the bottom of each recess 31. The panel portion 22 is rectangular. Engaging plates 32 are provided on the edges of the panel portion 22. Each engaging plate 32 corresponds to one of the recesses 31. The engaging plates 32 are used for attaching the panel portion 22 to the case main body 21.

A through hole 32a is formed in each engaging plate 32. The recesses 31 of the case main body 21 receive the engaging plates 32 of the panel portion 22, and the projections 31a of the recesses 31 are engaged with the through holes 32a. Accordingly, the panel portion 22 is attached to the case main body 21 to close the opening of the case main body 21. In FIG. 2, the recesses 31 and the engaging plates 32 are omitted for purposes of illustration.

The panel portion 22 has a front side 22a and a back side 22b. The front side 22a forms a part of the surface of the case 10. The back side 22b is opposite from the front side 22a. An electronic key insertion slot 23 is formed in the front side 22a. The slot 23 communicates with the interior of the case 10, or the interior (an accommodation space) of the case main body 21. The slot 23 is located in a center of the front side 22a and extends along the longitudinal direction of the front side 22a (vertically as viewed in the drawing).

The cross-sectional shape of the slot 23 is substantially the same as a cross-section of the electronic key 5 along a direction perpendicular to the insertion direction of the electronic key 5. In this embodiment, the cross-sectional shape of the electronic key 5 is rectangular. Hereinafter, the insertion direction of the electronic key 5 will be referred to as depth direction.

Figure 3:
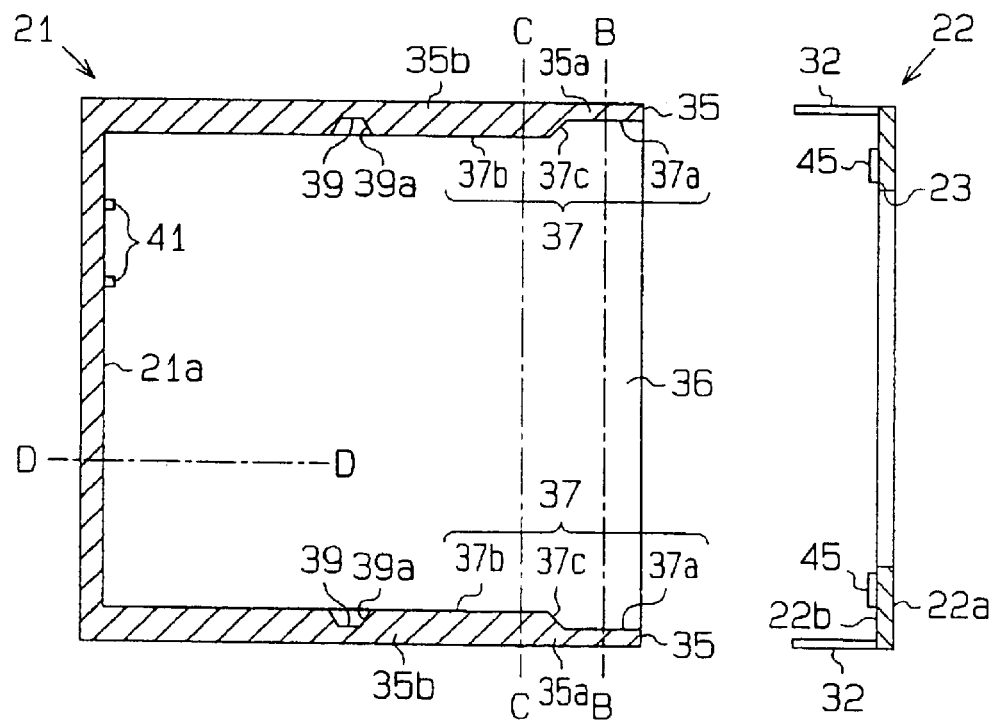
FIG. 3 is a cross-sectional view of the case main body and a panel portion shown in FIG. 2 taken along line A—A.

As shown in FIG. 3, the case main body 21 has a pair of sidewalls (herein after referred to as operational walls 35). The operational walls 35 contact the lateral sides of the back side 22b of the panel portion 22. Each operational wall 35 has a thin portion 35a next to the opening of the case main body 21. Each thin portion 35a is formed by removing part of the corresponding operational wall 35 from inside. Hereinafter, an inside section of each operational wall 35 of the case main body 21 will be referred to as a thick portion 35b. Among the sidewalls of the case main body 21, the sidewalls perpendicular to the operational walls 35, or the sidewalls contacting the longitudinal edges of the back side 22b, will be referred to as structural walls 36.

The thickness of each operational wall 35 gradually increases from the thin portion 35a to the thick portion 35b. That is, inner surface of each operational wall 35 (operational surface 37) is formed of the inner surface of the thin portion 35a (thin surface 37a), the inner surface of the thick portion (thick surface 37b), and an inclined surface 37c coupling the thin surface 37a and the thick surface 37b. An engaging recess 39 is formed in each thick surface 37b.

The radius of each engaging recess 39 gradually decreases from the open end to the bottom. An inclined surface (slope) 39a is formed between the bottom of each engaging recess 39 and the corresponding operational surface 37.

Figure 4:
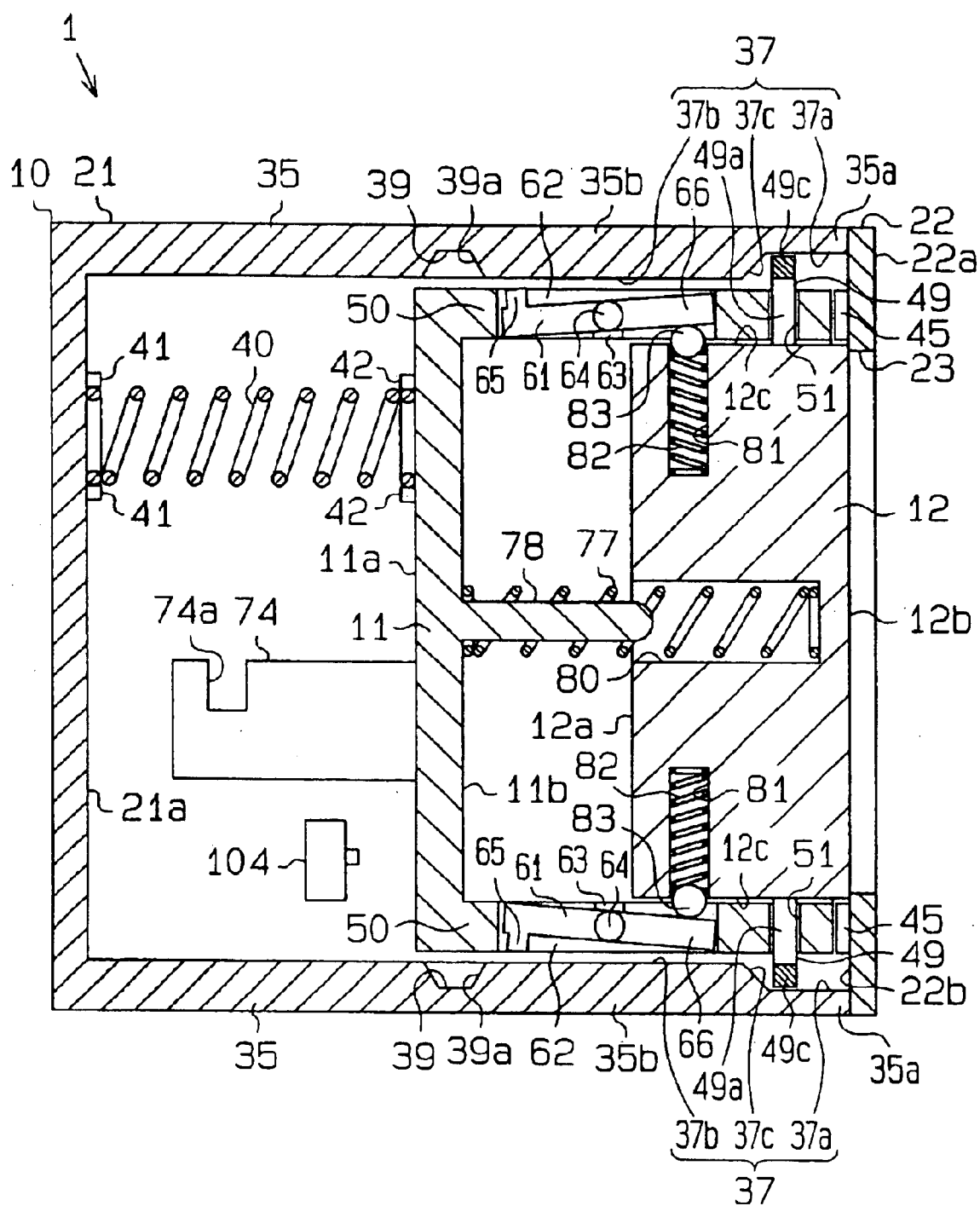
FIG. 4 is a cross-sectional view of the slot mechanism shown in FIG. 2 taken along line A—A.

As shown in FIG. 4, a shutter holder 11 is located in the interior of the case 10. The shutter holder 11 has a rectangular cross-section and a closed end. The opening of the shutter holder 11 faces the same direction as the opening of the case main body 21. The outer shape of the vertical cross-section of the sidewalls of the shutter holder 11 is substantially the same as the inner shape of the cross-section of the case main body 21 at a portion corresponding to the thick portions 35b. The shutter holder 11 is slidable along the depth direction in the case main body 21 along the operational surfaces 37.

An elastic member for urging the shutter holder 11 is located between the bottom inner surface 21a of the case main body 21 and the bottom outer surface 11a of the shutter holder 11. In this embodiment, the elastic member is a holder coil spring 40. One end of the holder coil spring 40 is engaged with a spring seat 41 provided on the bottom inner surface 21a of the case main body 21. The other end of the spring 40 is engaged with a spring seat 42 formed on the bottom outer surface 11a of the shutter holder 11. The shutter holder 11 is always urged toward the slot 23 by the force of the holder coil spring 40. When no object (electronic key 5 or a finger) is inserted in the slot 23 of the slot mechanism 1, the opening of the shutter holder 11 contacts stoppers 45 provided on the back side 22b. When the opening of the holder 11 contacts stoppers 45, the holder 11 is located at a first position.

Figure 1:
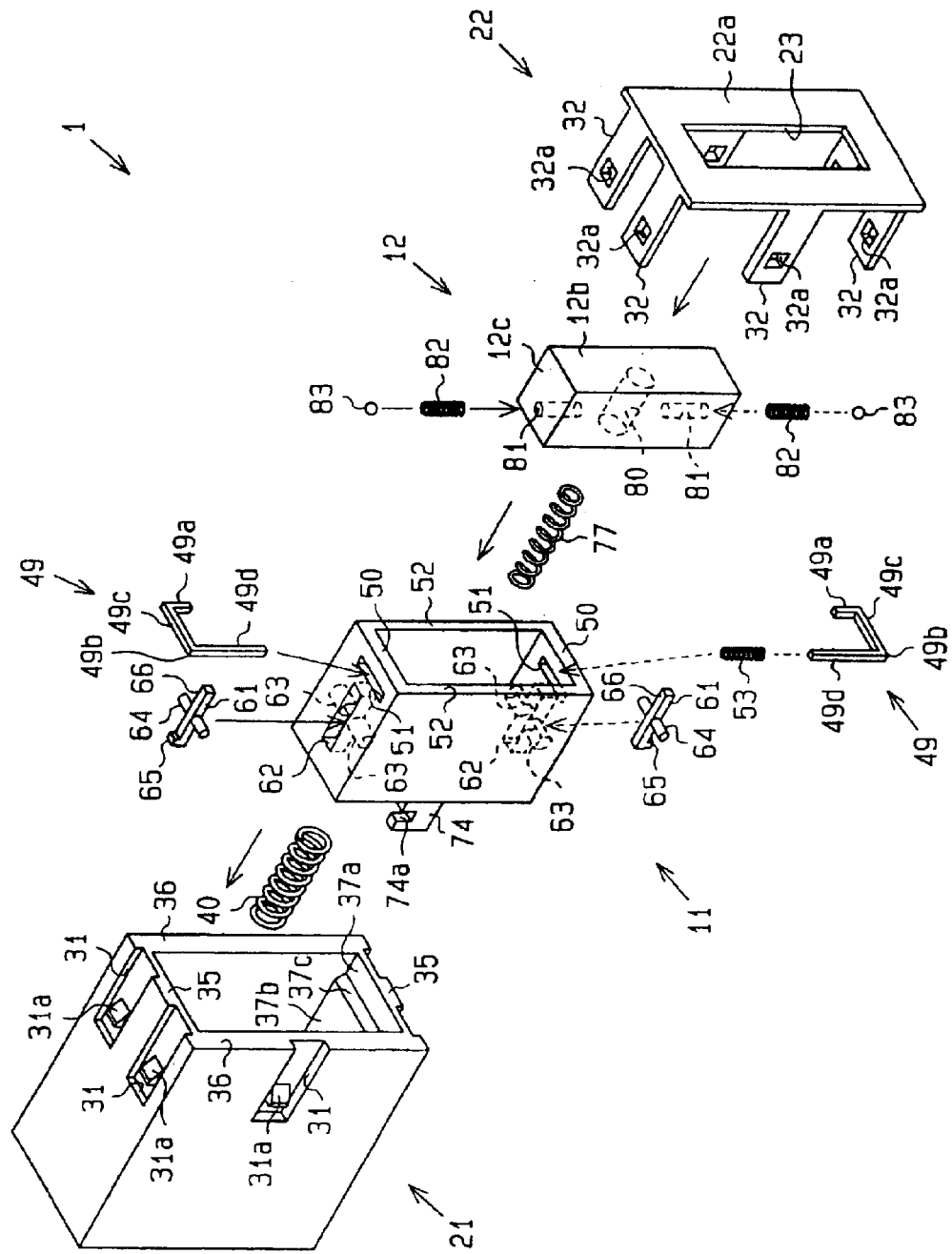
FIG. 1 is an exploded perspective view illustrating a slot mechanism according to one embodiment of the present invention.
Figure 5:
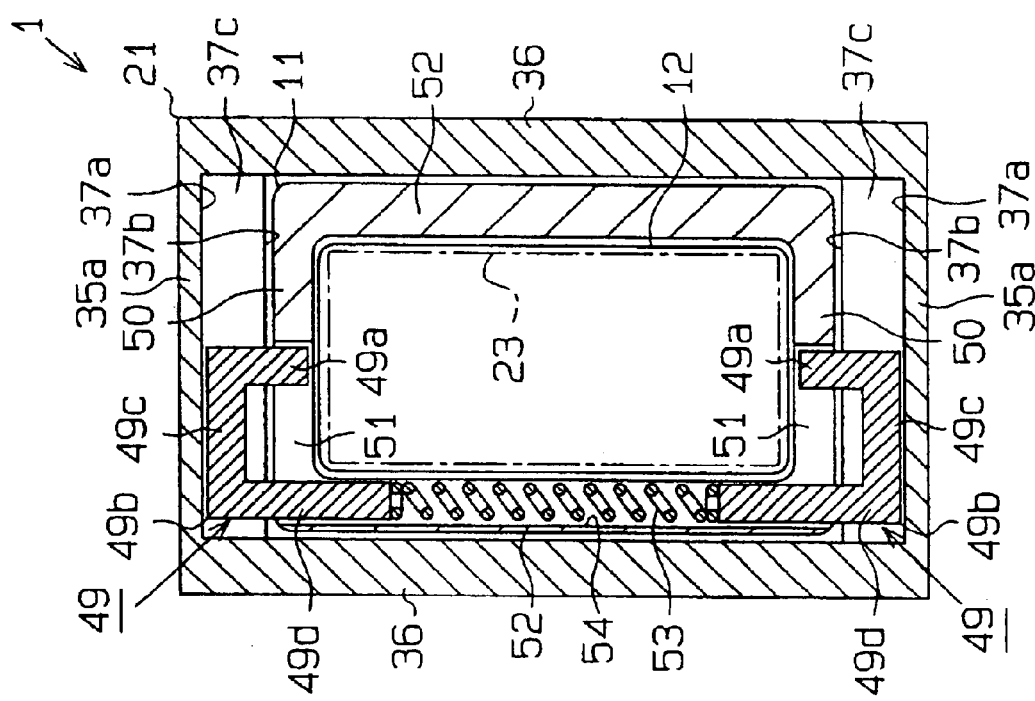
FIG. 5 is a cross-sectional view of the slot mechanism shown in FIG. 2 taken along line B—B.
Figure 6:
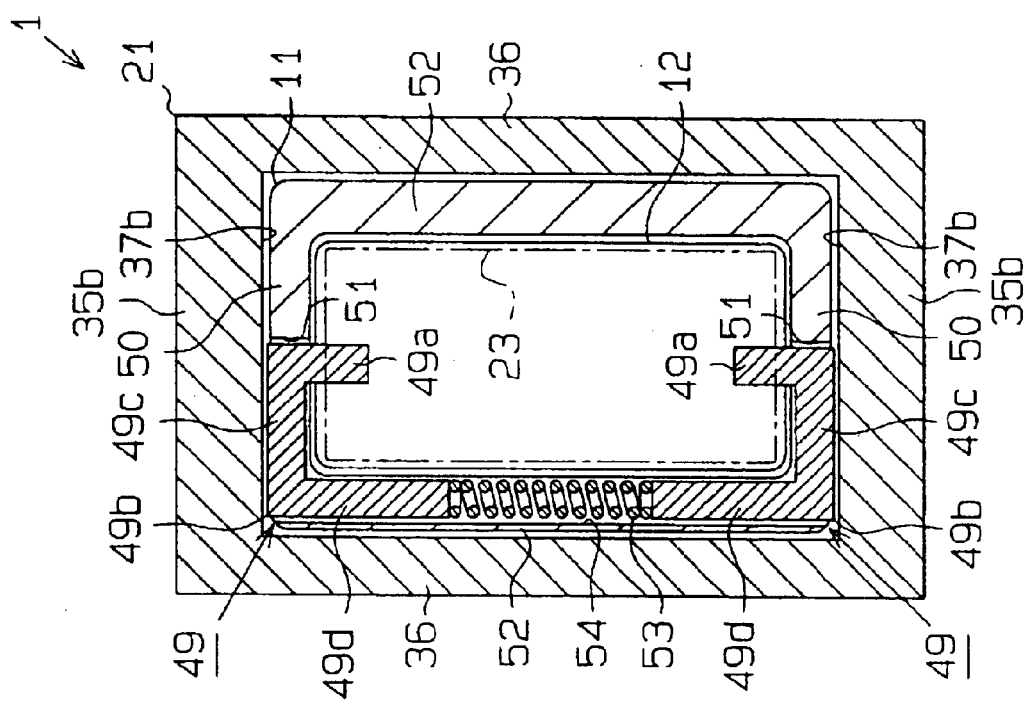
FIG. 6 is a cross-sectional view of the slot mechanism shown in FIG. 2 taken along line C—C.

As shown in FIGS. 1, 5, and 6, the shutter holder 11 has a pair of locking pieces 49. The locking pieces 49 form a portable device locking mechanism (an insertion object locking mechanism) that lock the electrical key 5 to the shutter holder 11. Among the sidewalls of the shutter holder 11, a pair of the sidewalls facing the operational surfaces 37 of the case main body 21 will be referred to as functional walls 50. Each functional wall 50 has a through hole for receiving the corresponding locking piece 49, or a locking piece hole 51. Each locking piece 49 is located in the corresponding locking piece hole 51.

The locking piece holes 51 are located in the vicinity of the opening of the shutter holder 11. A pair of the sidewalls of the shutter holder 11 facing the structural walls 36 of the case main body 21 will be referred to as operational walls 52. Each locking piece hole 51 extends toward one of the operational walls 52 (left one as viewed in the drawing) from a vicinity of a center line that divides the corresponding functional wall 50 into equal halves. A groove 54 is formed in an inner surface of the operational wall 52 toward which the locking piece holes 51 extend. The groove 54 is integral with the locking piece holes 51. The groove 54 is omitted in FIG. 1.

Each locking piece 49 includes a locking portion 49a and an L-shaped arm portion 49b. The arm portion 49b includes a long portion 49d extending along the groove 54 and a short portion 49c. The short portions 49c extend from upper and lower ends of the long portion 49d along the locking piece holes 51. The locking portion 49a is connected to an end of the short portion 49c that is opposite from the end to which the long portion 49d is attached. The locking portion 49a extends parallel to the long portion 49d. The locking portion 49a and the long portion 49d extend from the short portion 49c in the same direction. The length of each locking portion 49a is substantially equal to a value obtained by subtracting the thickness of the thin portion 35a from the sum of the thickness of the functional wall 50 of the shutter holder 11 and the thickness of the thick portion 35b of the operational wall 35 of the case main body 21.

The long portion 49d of the arm portion 49b of each locking piece 49 is loosely fitted in the corresponding locking piece hole 51 along the groove 54. The short portion 49c is loosely fitted in the corresponding locking piece hole 51 along the longitudinal direction of the locking piece hole 51. A locking coil spring 53 is located between the free ends of the long portions 49d of the locking pieces 49. The locking coil spring 53 contacts the free ends of the long portions 49d.

The locking pieces 49 are always urged by the force of the locking coil spring 53 such that the short portions 49c protrude from the locking piece holes 51 to the outside of the shutter holder 11. Thus, the short portions 49c always contact the operational surfaces 37 of the case main body 21. When no object is inserted in the slot 23, the short portions 49c of the arm portions 49b contact the thin surfaces 37a.

As shown in FIGS. 1 and 4, the shutter holder 11 has a pair of tactile feedback pieces 61. The tactile feedback pieces 61 function as engaging members that form a holder retaining mechanism for retaining the shutter holder 11 in the case main body 21. A tactile feedback piece hole 62 is formed in each functional wall 50 of the shutter holder 11. Each tactile feedback piece hole 62 extends through the corresponding functional wall 50 to connect the outside of the shutter holder 11 with the inside. Each tactile feedback piece 61 is provided in the corresponding tactile feedback piece hole 62.

Specifically, each tactile feedback piece hole 62 is located in the center of the corresponding functional wall 50.

Each tactile feedback piece hole 62 is thin and extends along the depth direction of the shutter holder 11. Each tactile feedback piece 61 has a rotary shaft 64 integrally formed with the tactile feedback piece 61. The tactile feedback piece 61 and the rotary shaft 64 form a cross. Recesses 63 are formed in the inner surfaces of the functional walls 50 to rotatably receive the rotary shafts 64. Each recess 63 extends transversely relative to a center portion of the corresponding tactile feedback piece hole 62. Each tactile feedback piece 61 is located along the longitudinal direction of the corresponding tactile feedback piece hole 62 and rotates about the rotary shaft 64. On an end of each tactile feedback piece 61 corresponding to the bottom of the shutter holder 11, a projection 65 projects to the corresponding operational surface 37 of the case main body 21. The projection 65 can engage with the corresponding engaging recess 39 when the shutter holder 11 is located at a second position.

The shutter holder 11 includes a holder locking member, which is a locking arm 74. The locking arm 74 forms a holder locking mechanism. As shown in FIG. 4, the locking arm 74 protrudes from the bottom outer surface 1 ha of the shutter holder 11 toward the bottom inner surface 21a of the case main body 21. An engaging portion is formed near the distal end of the locking arm 74. The engaging portion is a notch 74a in this embodiment.

Figure 7:
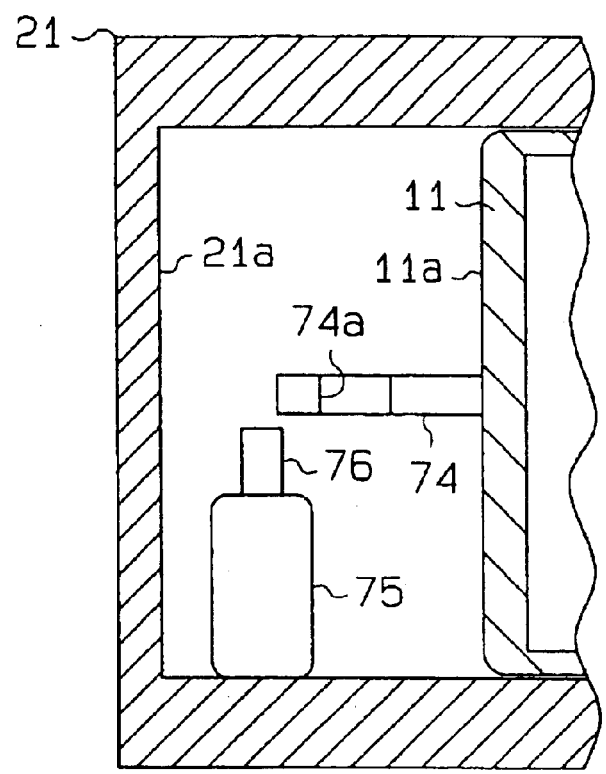
FIG. 7 is a partial cross-sectional view of the slot mechanism shown in FIG. 2 taken along line D—D.

As shown in FIG. 7, the case main body 21 has a solenoid 75 located in the vicinity of the bottom inner surface 21a. The solenoid 75 has a plunger 76 that moves along a direction perpendicular to the locking arm 74. The solenoid 75 is activated when receiving electricity. When the electricity is supplied to the solenoid 75, the plunger 76 is projected. When no electricity is supplied to the solenoid 75, the plunger 76 is retracted.

As shown in FIGS. 1 and 4, the shutter 12 is located in the interior of the shutter holder 11. The shutter 12 has a substantially rectangular cross-section. With respect to the depth direction, the vertical cross-cross section is substantially the same as the inner shape of the cross-section of the shutter holder 11. The shutter 12 is slidable along the depth direction in the interior of the shutter holder 11 along the inner surface of the shutter holder 11.

When a surface 12b of the shutter 12 at the side facing the slot 23 is located at the opening of the shutter holder 11 or closer to the slot 23 than the opening of the shutter holder 11 along the depth direction, the shutter 12 is located at a third position. When the shutter 12 contacts the bottom inner surface 11b of the shutter holder 11, the shutter 12 is located at a fourth position. The shutter 12 is movable relative to the shutter holder 11 and between the third position and the fourth position.

A shutter coil spring (a shutter urging member) 77 is located between the bottom inner surface 11b of the shutter holder 11 and the shutter 12. A substantially cylindrical guide pin 78 is provided in the center of the bottom inner surface 11b of the shutter holder 11. The guide pin 78 extends toward the slot 23. One end of the shutter coil spring 77 is loosely fitted to the guide pin 78, and contacts the bottom inner surface 11b.

The surface 12a of the shutter 12 faces the bottom inner surface 11b of the shutter holder 11. A guide hole 80 is formed in the center of the surface 12a. The other end of the shutter coil spring 77 contacts the bottom of the guide hole 80. The shutter 12 is always urged toward the slot 23 by the force of the shutter coil spring 77. When an object is inserted in the slot 23, the surface 12b of the shutter 12 contacts the back side 22b of the panel portion 22. That is, the slot 23 is closed.

The spring constant of the shutter coil spring 77 is sufficiently lower than the spring constant of the holder coil spring 40. Therefore, if the magnitude of compression force acting on the shutter coil spring 77 is equal to the magnitude of compression force acting on the holder coil spring 40, the shutter coil spring 77 is contracted by a greater degree than the holder coil spring 40.

On a pair of surfaces 12c of the shutter 12 that each face one of the functional walls 50 of the shutter holder 11, an accommodation hole 81 is formed. In each accommodation hole 81, a pressing member, which is a tactile feedback coil spring 82, and a tactile feedback ball 83 are provided. The tactile feedback ball 83 is selectively protruded from and retracted in the accommodation hole 81. One end of each tactile feedback coil spring 82 contacts the bottom of the corresponding accommodation hole 81. The other end of the tactile feedback coil spring 82 contacts the corresponding tactile feedback ball 83. The tactile feedback ball 83 is urged by the tactile feedback coil spring 82 in the direction protruding from the accommodation hole 81, and always contacts the tactile feedback piece 61. When no object is inserted in the slot 23, each tactile feedback ball 83 contacts the corresponding tactile feedback piece 61 at a position closer to the panel portion 22 (closer to the slot 23) than the rotary shaft 64.

The slot mechanism 1 is installed in a "smart ignition system" of a vehicle.

Figure 8:
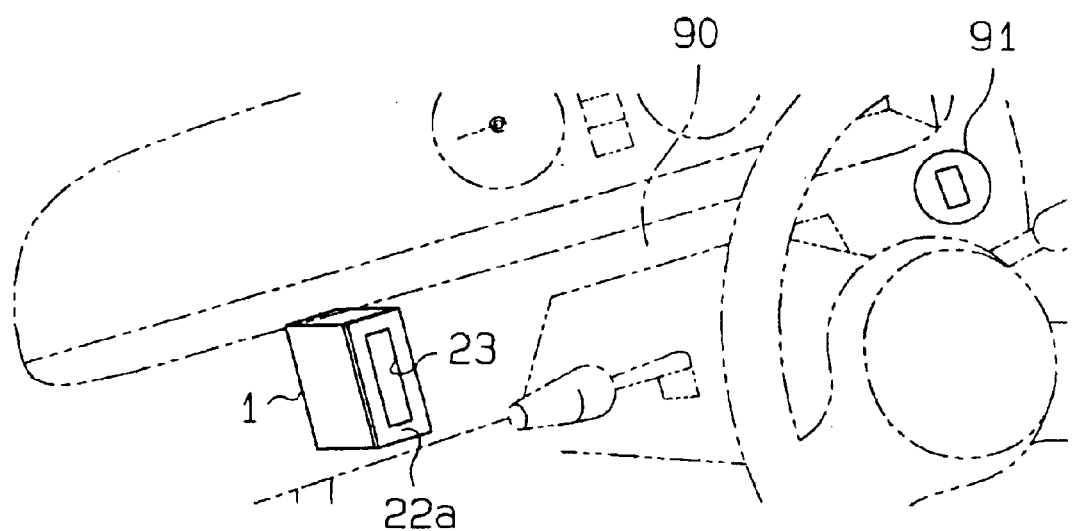
FIG. 8 is a diagrammatic view showing the appearance of an instrument panel in which the slot mechanism of FIG. 2 is installed.

As shown in FIG. 8, on an instrument panel 90 in a passenger compartment, the slot mechanism 1 and an operation mechanism 91 are provided. A user of the vehicle manipulates the operation mechanism 91 to operate the smart ignition system. The case 10 of the slot mechanism 1 is located in the panel 90. The front side 22a of the panel portion 22 is substantially flush with the outer surface of the panel 90.

The electric configuration and the operation of the smart ignition system will now be described.

Figure 9:
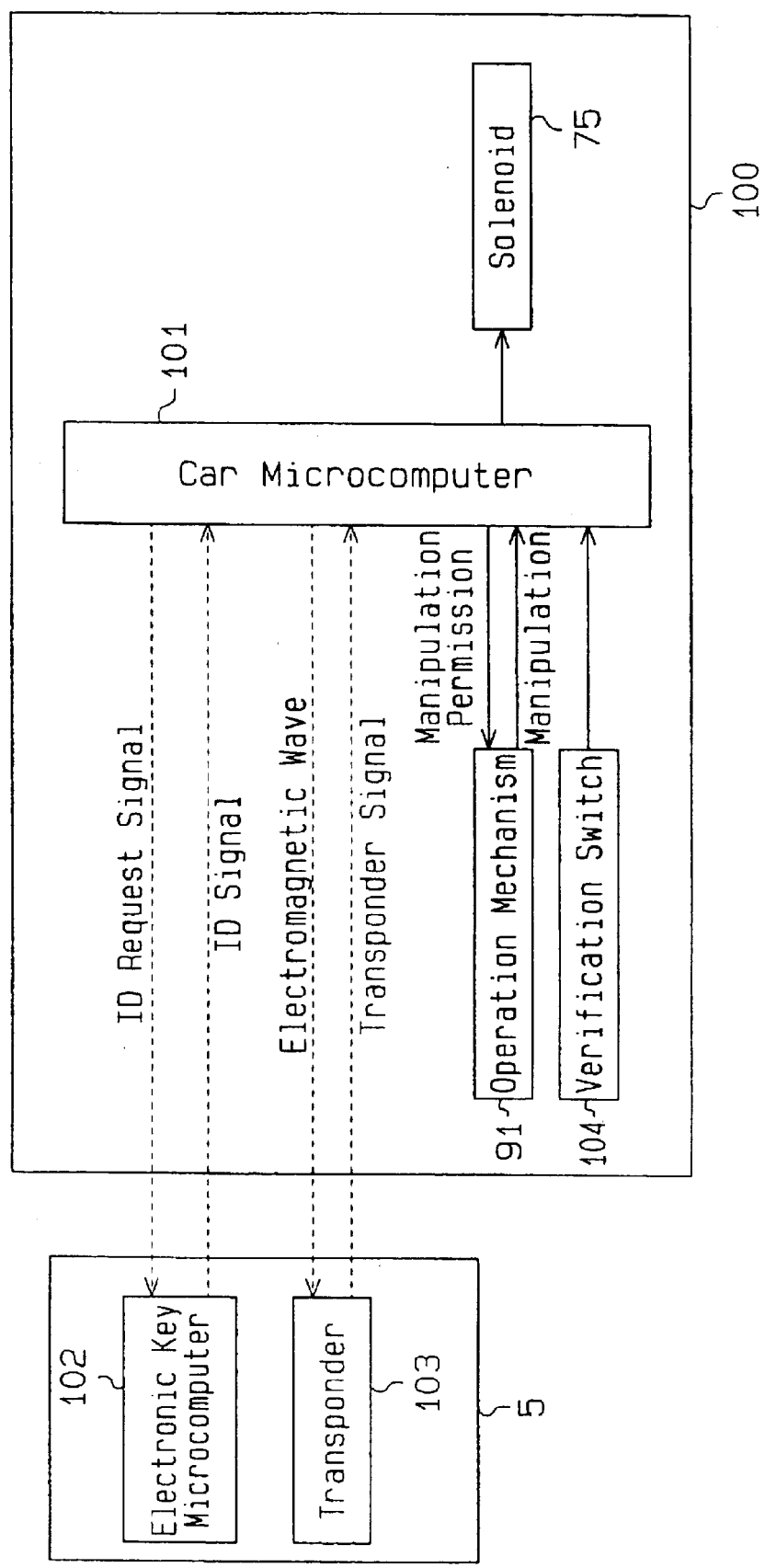
FIG. 9 is a diagrammatic view showing an electrical construction of the electronic key of FIG. 2 and a car controller.

As shown in FIG. 9, the smart ignition system includes a car controller 100 mounted on the vehicle and the electronic key 5 carried by a vehicle user. Although not illustrated, each of the electronic key 5 and the car controller 100 has a transmission circuit and a reception circuit that wirelessly transmit various signals. The transmission circuit outputs transmission signals through an antenna connected to the transmission circuit. On the other hand, the reception circuit receives signals through an antenna connected to the reception circuit and demodulates the received signals.

The car controller 100 includes a car microcomputer 101, which functions as a verification portion. The car microcomputer 101 wirelessly transmits a data signal, which is an ID request signal, through the transmission circuit. The car microcomputer 101 has a memory that stores a unique ID code. The ID code is assigned to each of the vehicles owned by the user.

The electronic key 5 has an electronic key microcomputer 102 that is provided with a data signal, which is an ID signal. The ID signal contains an ID code for allowing the vehicle of the user to be identified from other vehicles. The ID code is stored in a memory provided in the key microcomputer 102. The key microcomputer 102 receives the ID request signal from the car microcomputer 101 through the reception circuit, and determines whether the ID request signal is the ID request signal of the user. Only when determining that the ID request signal is the ID request signal from the vehicle owned by the user, the key microcomputer 102 sends an ID signal to the car controller 100 through the transmission circuit.

The car microcomputer 101 compares the ID code stored in the memory and the ID code contained in the ID signal from the electronic key 5. When the ID codes match, the car microcomputer 101 enables manipulation of the operation mechanism 91 by the user. Accordingly, the user can manipulate the operation mechanism 91 to start or stop the vehicle engine. In this manner, the ID verification between the electronic key 5 and the car controller 100 through wireless transmission permits the user to start and stop the vehicle engine without inserting the electronic key 5 into the slot 23.

The electronic key 5 includes a transponder 103. The car microcomputer 101 is electrically connected to a verification switch 104 (see FIG. 4). As described below, the verification switch 104 is turned on when the shutter holder 11 is pressed to a predetermined position (the second position) and contacts the verification switch 104. When the verification switch 104 is on, the car microcomputer 101 produces an electromagnetic field in the interior of the slot mechanism 1 to activating the transponder 103.

When the electronic key 5 is inserted in the key insertion slot 23 of the slot mechanism 1, the transponder 103 is placed in the electromagnetic field, which produces electromotive force in the coil of the transponder 103. Based on the electromotive force, the transponder 103 transmits a transponder signal. The transponder signal contains an ID code that is the same as that stored in the electronic key microcomputer 102.

The car microcomputer 101 verifies the ID code contained in the transponder signal against the ID code of the vehicle. If the ID codes match each other, the car microcomputer 101 enables manipulation of the operation mechanism 91 by the user.

Therefore, the verification switch 104 is turned on by inserting the electronic key 5 in the slot mechanism 1 to cause the transponder 103 to generate a transponder signal. Accordingly, the ID verification is performed to enable start and stop of the vehicle engine. Thus, even if the battery of the electronic key 5 is low, the engine can be started or stopped.

The operation of the slot mechanism 1 will now be described.

Figure 10:
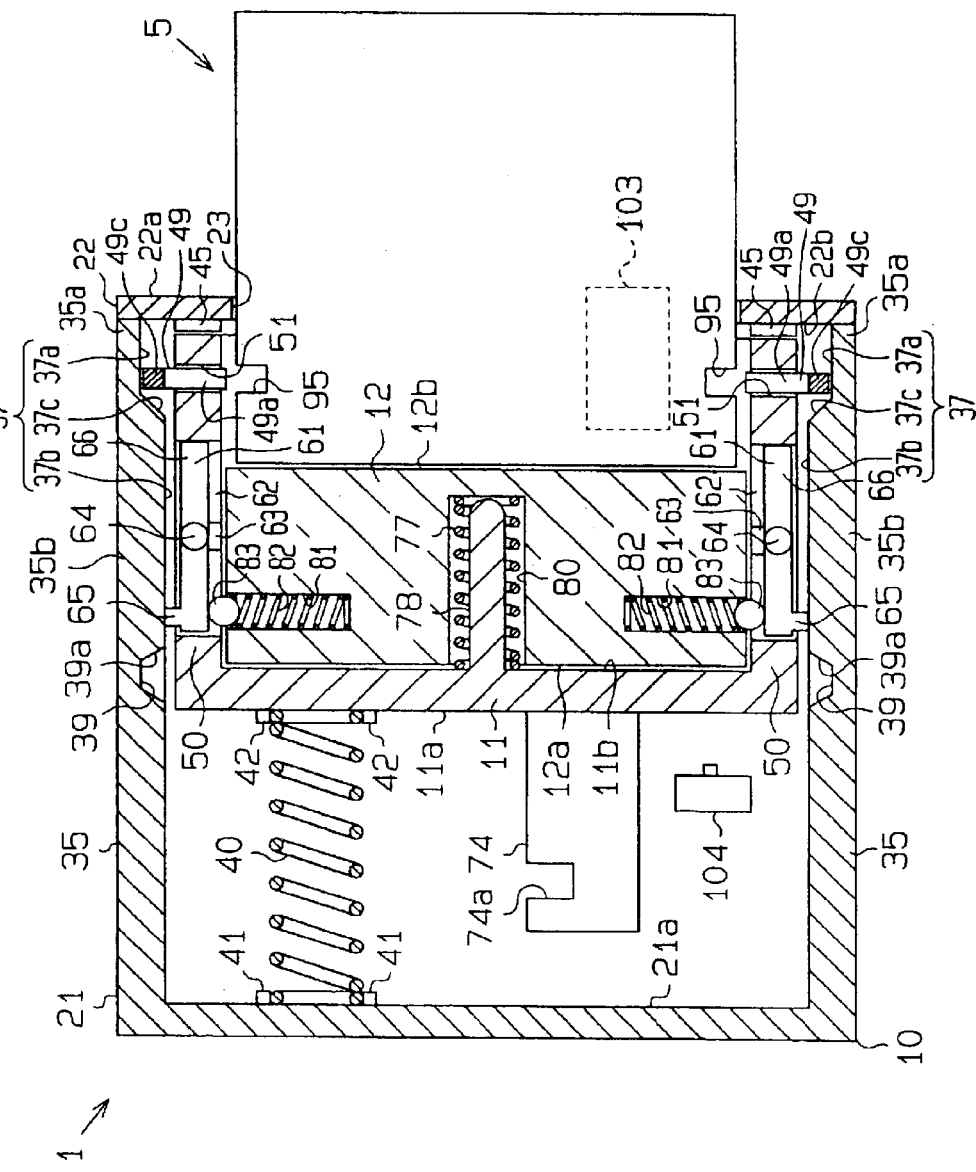
FIG. 10 is a cross-sectional view showing an operation of the slot mechanism shown in FIG. 2 taken along line A—A.

When the electronic key 5 is inserted in the slot 23 as shown in FIG. 10, the shutter 12 is pushed into the case 10 by the key 5. The shutter 12 is moved in the depth direction (from the third position to the fourth position) in the interior of the shutter holder 11 to contract the shutter coil spring 77. The guide pin 78 enters the guide hole 80.

Since the spring constant of the shutter coil spring 77 is sufficiently smaller than the holder coil spring 40, the holder coil spring 40 is scarcely contracted when the shutter 12 is moved in the interior of the shutter holder 11. The shutter holder 11 is therefore scarcely moved. The shutter 12 is moved to the fourth position where the surface 12a contacts the bottom inner surface 11b of the shutter holder 11.

The tactile feedback ball 83 in each accommodation hole 81 is urged toward the corresponding operational surface 37 by the force of the tactile feedback coil spring 82. As the shutter 12 is moved, each tactile feedback ball 83 is moved in the depth direction along the corresponding tactile feedback piece 61.

The position at which each tactile feedback ball 83 contacts the corresponding tactile feedback piece 61, or the point of action at which the force of the tactile feedback coil spring 82 acts on the tactile feedback piece 61, is moved from a position that is closer to the open end of the shutter holder 11 than the rotary shaft 64 of the tactile feedback piece 61 to a position that is closer to the bottom of the shutter holder 11 than the rotary shaft 64 through a position corresponding to the rotary shaft 64. When the tactile feedback ball 83 is moved to a position closer to the opening of the shutter holder 11 than the rotary shaft 64, the projection 65 is separated from the operational surface 37. An end 66 of each tactile feedback piece 61 opposite from the projection 65 is engaged with the tactile feedback piece hole 62 of the shutter holder 11. The end 66 therefore does not protrude outward or contact the operational surface 37.

When each tactile feedback ball 83 is moved from a position closer to the opening of the shutter holder 11 than the rotary shaft 64 to a position closer to the bottom, the tactile feedback piece 61 is pivoted so that the projection 65 contacts the operational surface 37. Therefore, when each tactile feedback ball 83 is closer to the bottom of the shutter holder 11 than to the rotary shaft 64, a hand of a user inserting the electronic key 5 receives frictional resistance due to contact between the projections 65 and the operational surfaces 37 by the force of the springs 82. That is, the user feels tactile feedback.

The moment about the rotary shaft 64 that is generated by the force of the spring 82 and acts on the tactile feedback piece 61 is increased as the tactile feedback ball 83 approaches the bottom of the shutter holder 11. That is, the force with which the tactile feedback coil spring 82 presses the projection 65 against the engaging recess 39 is increased. This increases the frictional resistance. Accordingly, a user inserting the electronic key 5 receives a greater tactile feedback as he/she presses the key 5 further.

Figure 11:
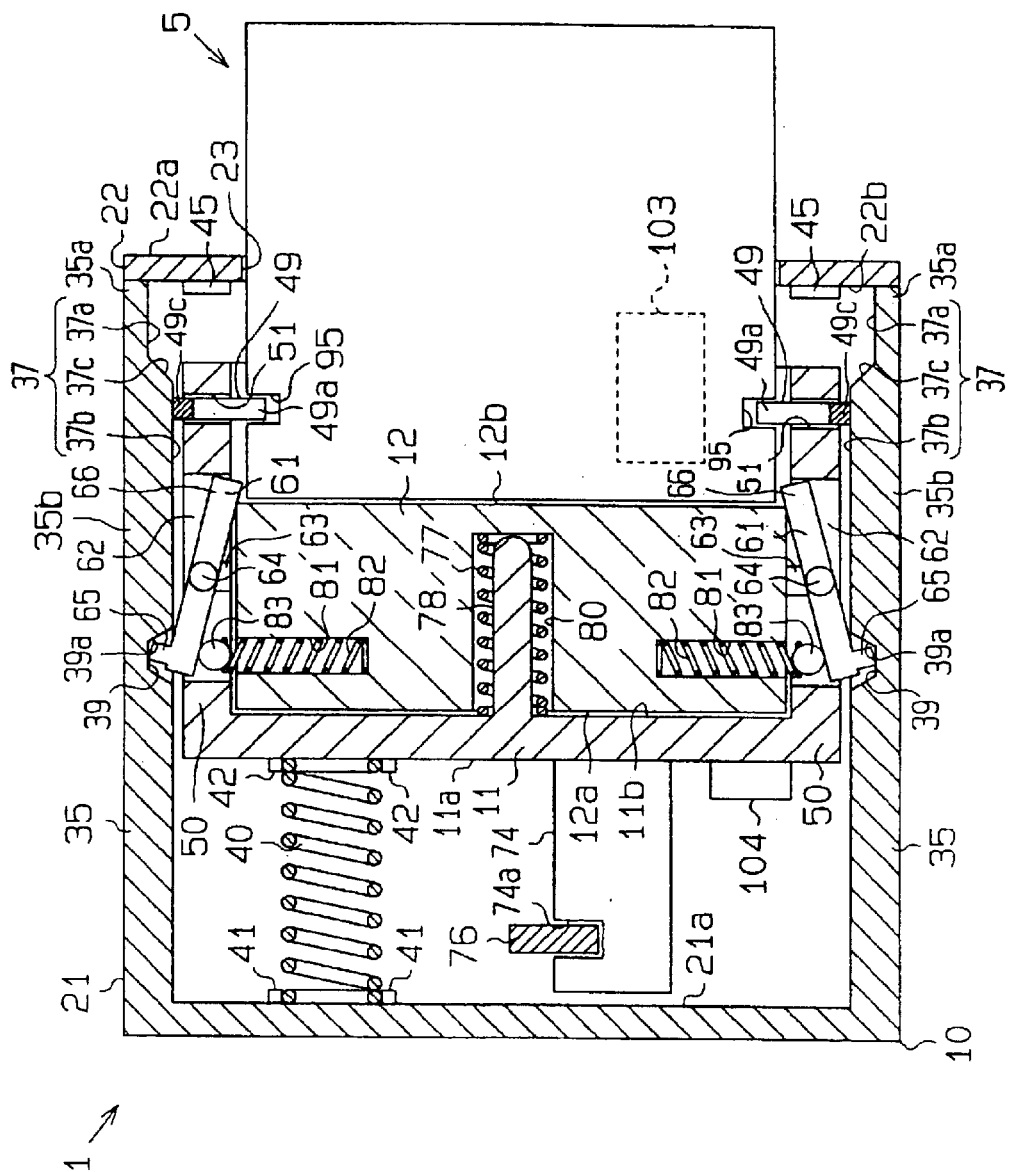
FIG. 11 is a cross-sectional view showing an operation of the slot mechanism shown in FIG. 2 taken along line A—A.

If the electronic key 5 is pushed further from the state of FIG. 11 where the bottom inner surface 11*b* of the shutter holder 11 contacts the shutter 12, the shutter holder 11 is pressed in the depth direction of the case main body 21 with the shutter 12 and moved from the first position to the second position.

At this time, as the shutter holder 11 is moved, the position at which the operational surface 37 contacts the short portion 49*c* of the locking piece 49 is moved from the thin surface 37*a*, which is closer to the opening of the case main body 21, to the thick surface 37*b*, which is closer to the bottom, through the inclined surface 37*c*. Therefore, the locking piece 49 is pressed into the interior of the shutter holder 11 by the distance corresponding to the value obtained by subtracting the thickness of the thin portion 35*a* from the thickness of the thick portion 35*b*. When the locking piece 49 is pressed into the interior of the shutter holder 11, the locking portion 49*a* of the locking piece 49 projects to the interior of the shutter holder 11. Therefore, each locking portion 49*a* is received by one of two locking recesses 95 formed in the electronic key 5. The electronic key 5 is locked to the shutter holder 11.

Specifically, the locking recesses 95 of the electronic key 5 are formed in portions that face the locking portions 49*a* when the shutter 12 contacts the bottom inner surface 11*b* of the shutter holder 11.

When the shutter holder 11 contacts the stoppers 45, that is, the shutter holder 11 is located at the first position, the short portions 49*c* contact the thin surfaces 37*a* (see FIG. 5). The length of each locking portion 49*a* is substantially equal to a value obtained by subtracting the thickness of the thin portion 35*a* from the sum of the thickness of the functional wall 50 of the shutter holder 11 and the thick portion 35*b* of the case main body 21. Therefore, when the shutter holder 11 contacts the stopper 45, the locking portions 49*a* do not protrude in the interior of the shutter holder 11.

However, when the electronic key 5 is pressed further and the shutter holder 11 is moved in the depth direction, the short portions 49*c* contact the corresponding inclined surfaces 37*c*. If the shutter holder 11 is moved further in the depth direction while the short portions 49*c* are contacting the inclined surfaces 37*c*, the short portions 49*c* are pushed along the inclined surfaces 37*c* and enter the locking piece holes 51. Accordingly, the locking portions 49*a* gradually protrude to the interior of the shutter holder 11. Each locking portion 49*a* enters the corresponding locking recess 95 of the electronic key 5, which faces the locking portion 49*a*. When the shutter holder 11 is moved such that the short portions 49*c* contact the thick portions 37*b* as shown in FIG. 6, the amount by which each locking portion 49*a* enters the corresponding locking recess 95 is maximized. This locks the electronic key 5 to the shutter holder 11.

After the electronic key 5 locks the shutter holder 11, if the electronic key 5 is pressed further against the force of the holder coil spring 40, the shutter holder 11 is moved further in the depth direction, and the projection 65 of each tactile feedback piece 61 faces the engaging recess 39 of the corresponding operational surface 37 when the shutter holder 11 comes to the second position. Since each tactile feedback piece 61 is urged toward the corresponding operational surface 37 by the force of the corresponding retaining spring 82, the projection 65 enters the engaging recess 39 along the inclined surface 39*a*.

Accordingly, the shutter holder 11 is engaged with the case main body 21 as shown in FIG. 11. The electronic key 5 is held by the slot mechanism 1 while pressing the shutter 12, which is located at the fourth position, and the shutter holder 11 in the depth direction.

Specifically, the distance between the engaging recess 39 and the locking portion 49*a* with respect to the depth direction is substantially equal to the sum of the distance between the projection 65 of the tactile feedback piece 61 and the surface 12*b* of the shutter 12 contacting the electronic key 5 (the distance between the accommodation hole 81 and the surface 12*b*) and the distance between the locking recess 95 of the electronic key 5 and the surface 12*b*. Since the electronic key 5 is locked to the shutter holder 11, even if the user releases the electronic key 5, the shutter 12 is maintained at the pressed position (the fourth position) where the shutter 12 contacts the bottom inner surface 11*b* of the shutter holder 11. Therefore, each tactile feedback ball 83 is maintained at a position where the tactile feedback ball 83 presses the corresponding projection 65 into the corresponding engaging recess 39.

The shutter 12 is prevented from moving toward the slot 23 by the electronic key 5, which is locked to the shutter holder 11 by the locking pieces 49. The force of the spring 82 that presses the projection 65 into the engaging recess 39 is greater than the force of the holder coil spring 40 that presses the shutter holder 11 toward the slot 23. Therefore, even if the user releases the electronic key 5, the shutter holder 11 is maintained in the case main body 21 at the second position where the projections 65 are pressed into the engaging recesses 39. Unless the locking pieces 49 are released by a movement of the shutter holder 11 from the second position to the first position (toward the slot 23), the electronic key 5 is held locked to the shutter holder 11. As a result, the electronic key 5 continues being held by the slot mechanism 1 in this state.

The verification switch 104 is provided in the interior of the case main body 21. When the projections 65 enter the engaging recesses 39 and the shutter holder 11 is moved to the second position to be engaged with the case main body 21, the verification switch 104 contacts the bottom outer surface 11a of the shutter holder 11 and is turned on.

When the verification switch 104 is turned on, the car microcomputer 101 verifies the ID code contained in the transponder signal from the transponder 103 against the ID code of the vehicle. When the ID codes match each other, if the user attempts to start the engine, the car microcomputer 101, to prevent the electronic key 5 from coming off the slot 23 during driving, locks the electronic key 5 to the slot mechanism 1 with the solenoid 75, thereby coupling the electronic key 5 with the slot mechanism 1 by a force greater than the force by which the springs 82 press the projections 65 into the engaging recesses 39. Specifically, the car microcomputer 101 applies electric current to the solenoid 75.

Figure 12:
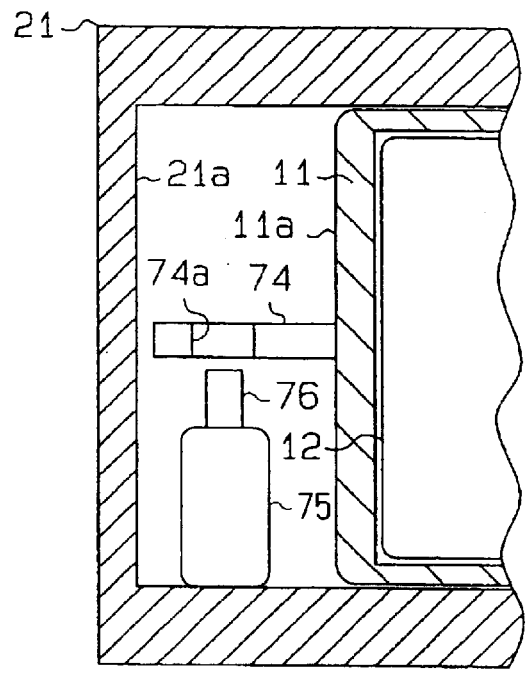
FIG. 12 is a partial cross-sectional view showing an operation of the slot mechanism shown in FIG. 2 taken along line D—D.

When the shutter holder 11 is at the second position to be engaged with the case main body 21 as shown in FIG. 12, the notch 74a of the locking arm 74 of the shutter holder 11 is at a position corresponding to the plunger 76.

Figure 13:
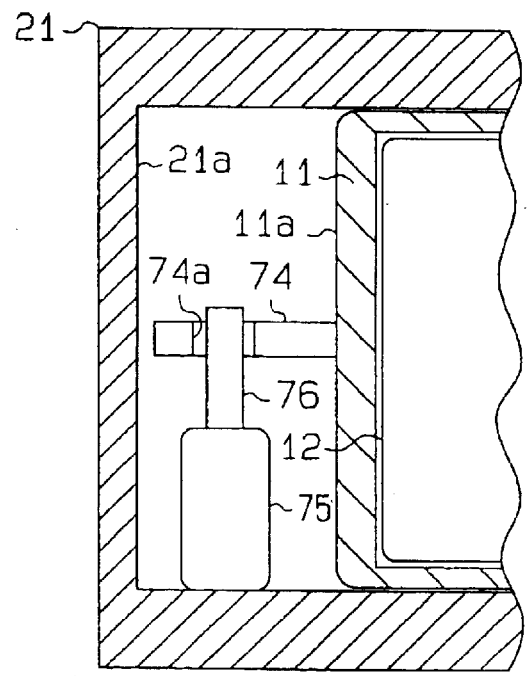
FIG. 13 is a partial cross-sectional view showing an operation of the slot mechanism shown in FIG. 2 taken along line D—D.

The applied electric current activates the solenoid 75 so that the retracted plunger 76 is projected as shown in FIG. 13. The distal end of the plunger 76 enters the notch 74a of the locking arm 74. Accordingly, the shutter holder 11 is locked to the case main body 21. Since the electronic key 5 is locked to the shutter holder 11, the electronic key 5 is locked to the slot mechanism 1. In this state, the user cannot pull out the electronic key 5.

When the user manipulates the operation mechanism 91 to stop the engine, the microcomputer 101 stops the current supplied to the solenoid 75, thereby moving the plunger 76 to the position shown in FIG. 12 (the retracted position). Accordingly, the shutter holder 11 is unlocked from the case main body 21.

When the shutter holder 11 is not locked to the case main body 21 by the solenoid 75, coupling of the shutter holder 11 with the case main body 21 is maintained by the engagement between the projections 65 of the tactile feedback pieces 61 with the engaging recesses 39 by the force of the tactile feedback coil springs 82. Such an engaging state between the shutter holder 11 and the case main body 21 occurs when the ID verification is not established or when the user has not perform manipulation to start the engine even if the user inserts the electronic key 5 into the slot mechanism 1 and turns the verification switch 104. In this state, the user can pull out the electronic key 5 from the slot mechanism 1 against the force of the springs 82 engaging the shutter holder 11 with the case main body 21.

Specifically, in this state, although the electronic key 5 is locked to the shutter holder 11, the shutter holder 11 is not locked to the case main body 21. Therefore, when the user attempts to pull out the electronic key 5 with a force greater than the engaging force of the springs 82 between the shutter holder 11 and the case main body 21, the projection 65 of each tactile feedback piece 61 is moved along the inclined surface 39a of the corresponding engaging recess 39 and exists the engaging recess 39. The shutter holder 11 is moved toward the slot 23 with the electronic key 5. Accordingly, a position of each operational surface 37 that contacts the short portion 49c of the locking piece 49 is moved from the thick surface 37b to the thin surface 37a through the inclined surface 37c.

Each short portion 49c, which has been pressed into the corresponding locking piece hole 51 by the corresponding thick surface 37b, is moved along the inclined surface 37c by the force of the locking coil spring 53 and is gradually projected toward the operational surface 37 from the locking piece hole 51. When each locking piece 49 protrudes toward the corresponding operational surface 37, the locking portion 49a, which has been in the interior of the shutter holder 11, or in the interior of the locking recess 95 of the electronic key 5, gradually exists the locking recess 95 and is retracted into the locking piece hole 51. When the shutter holder 11 is moved to a position where the short portions 49c contact the thin surfaces 37a, the locking portion 49a is entirely removed from the locking recess 95. That is, the electronic key 5 is released from the shutter holder 11. This enables the user to pull out the electronic key 5 from the slot mechanism 1.

When the electronic key 5 is pulled out from the slot mechanism 1, the shutter holder 11 is moved to the first position to contact the stopper 45 by the force of the holder coil spring 40. The shutter 12 is moved to a position (the third position) to contact the back side 22b of the panel portion 22 by the force of the shutter coil spring 77, and disconnects the interior of the slot mechanism 1 from the outside.

Next, a case where an object other than the electronic key 5, such as a finger, is inserted into the slot mechanism 1 will be described.

Figure 14:
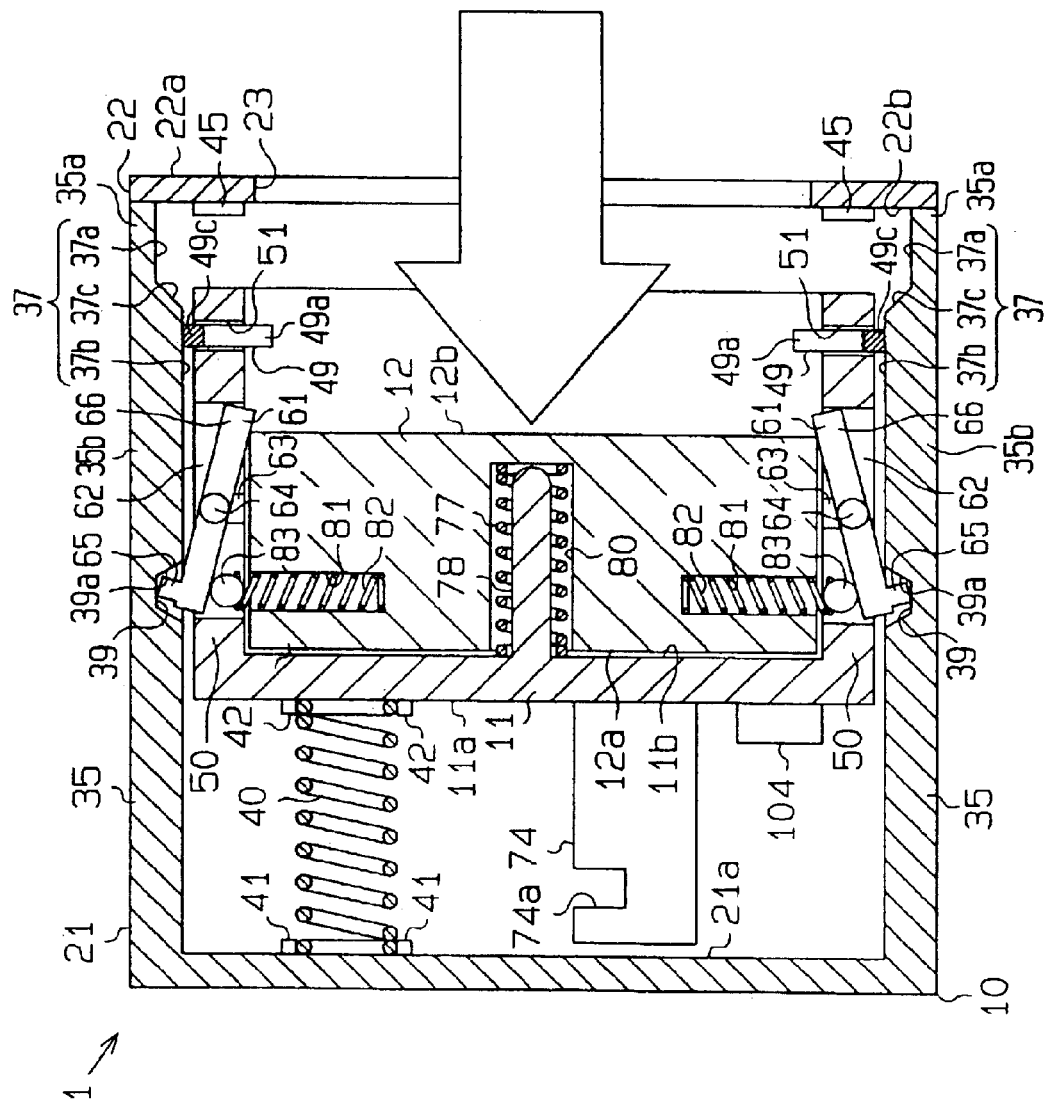
FIG. 14 is a cross-sectional view showing an operation of the slot mechanism shown in FIG. 2 taken along line A—A.
Figure 15:
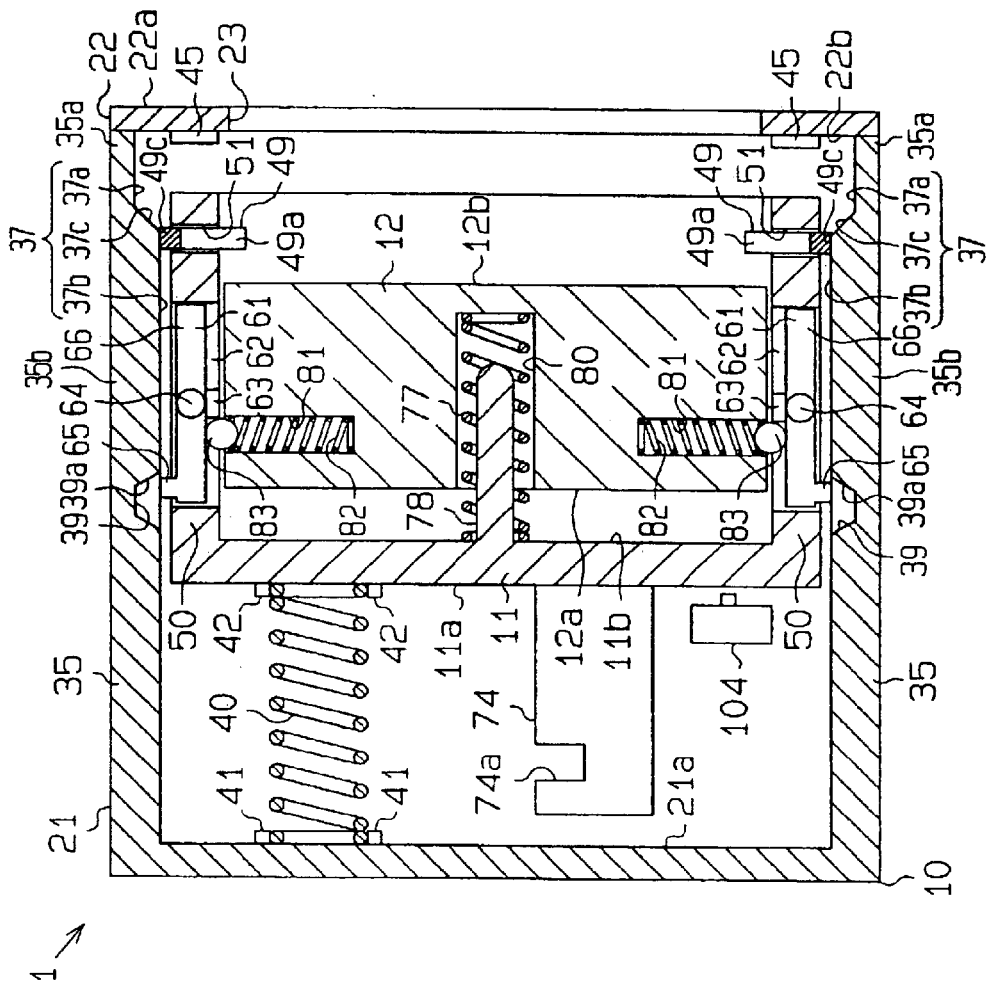
FIG. 15 is a cross-sectional view showing an operation of the slot mechanism shown in FIG. 2 taken along line A—A.

As shown in FIG. 14, an object other than the electronic key 5, for example a finger, is inserted in the slot 23 and the shutter 12 is pushed into the case 10, the shutter 12 is moved to the fourth position and the shutter holder 11 is moved to the second position where the shutter holder 11 is engaged with the case main body 21 by the engagement of the projections 65 with the engaging recesses 39 as in the case where the electronic key 5 is inserted in the slot 23.

When a finger is inserted, the bottom outer surface 11a of the shutter holder 11 contacts the verification switch 104 to turn the switch 104 on. However, since the ID verification does not take place, the plunger 76 is not activated and held retracted as shown in FIG. 12. Accordingly, the shutter holder 11 is not locked to the case main body 21.

When the user takes the finger off the shutter 12, there is nothing in the shutter holder 11 that prevents the shutter 12 toward the slot 23. The shutter 12 is there moved urged toward the slot 23 by the force of the shutter coil spring 77.

As the shutter 12 is moved toward the slot 23, positions at which the tactile feedback balls 83 press the tactile feedback pieces 61 are moved toward the slot 23. That is, the pressing positions are moved toward the rotary shafts 64. This decreases the moment about each rotary shaft 64 applied to the corresponding tactile feedback piece 61 by the force of the spring 82. Therefore, the force with which the tactile feedback coil spring 82 presses the projection 65 against the engaging recess 39 is decreased.

When the force of the holder coil spring 40 that presses the shutter holder 11 toward the slot 23 surpasses the engaging force between the shutter holder 11 and the case main body 21, each projection 65 is moved along the corresponding inclined surface 39a and comes off the engaging recess 39. The shutter holder 11 is then moved toward the slot 23 by the force of the spring 40.

The shutter holder 11 is moved toward the slot 23 by the force of the holder coil spring 40, and contacts the stopper 45 at the first position. The shutter 12 is moved toward the slot 23 by the force of the shutter coil spring 77, and contacts the back side 22b of the panel portion 22 at the third position. The shutter 12 then cuts off the interior of the slot mechanism 1 from the outside.

This embodiment has the following advantages.

(1) Each functional wall 50 of the shutter holder 11 includes the locking piece 49 for locking the electronic key 5 to the shutter holder 11, and the tactile feedback piece 61 for engaging the shutter holder 11 to the case main body 21.

Thus, when the electronic key 5 is inserted in the slot 23, the electronic key 5 is locked to the shutter holder 11 by the locking pieces 49. Further, the shutter holder 11 is retained to the case main body 21 with the tactile feedback pieces 61. This holds the electronic key 5 in the slot mechanism 1.

The engagement of the shutter holder 11 is disengaged from the case main body 21 by pulling the electronic key 5. The electronic key 5 is unlocked from the shutter holder 11 by moving the electronic key 5 outward. The holder coil spring 40 is located between the bottom inner surface 21a of the case main body 21 and the bottom outer surface 11a of the shutter holder 11. A shutter coil spring 77 is located between the bottom inner surface 11b of the shutter holder 11 and the shutter 12.

Therefore, even if the shutter 12 is pressed into the slot mechanism 1 by inserting the electronic key 5 in the insertion slot 23, removing the electronic key 5 from the slot 23 permits the shutter 12 to be moved to a position to close the slot 23 by the force of the springs 40, 77.

The locking pieces 49 do not lock objects other than the electronic key 5 such as fingers. When an object other than the electronic key 5 is inserted in the slot 23 and then removed, the shutter 12 is returned to the position to close the slot 23 by the force of the springs 40, 77. Therefore, even if pressed by a finger, the shutter 12 is not held pressed in the slot mechanism 1. Therefore, when an object such as the electronic key 5 or a finger is not inserted in the slot mechanism 1, the shutter 12 reliably closes the slot 23.

(2) When the shutter holder 11 is moved toward the bottom of the case main body 21, the locking portion 49a of each locking piece 49 projects into the shutter holder 11 and is received by the corresponding locking recess 95 formed in the electronic key 5. Therefore, the electronic key 5 is reliably locked to the shutter holder 11.

(3) Each operational surface 37 of the case main body 21 includes the thin surface 37a, the thick surface 37b, and the inclined surface 37c. Each locking piece 49 is always brought into contact with the corresponding operational surface 37 of the case main body 21 by the force of the corresponding spring 53.

As a result, when the shutter holder 11 is moved to the bottom of the case main body 21, each locking piece 49 is guided by the corresponding operational surface 37 and pressed into the corresponding locking piece hole 51. Thus, since the locking portion 49a of each locking piece 49 projects into the interior of the shutter holder 11, the electronic key 5 is reliably locked.

(4) The thick portion 35b of each operational surface 37 of the case main body 21 includes the engaging recess 39. Each tactile feedback piece 61 includes a projection 65 projecting toward the corresponding operational surface 37. The shutter includes the accommodation holes 81 facing the functional walls 50. In each accommodation hole 81, the tactile feedback coil spring 82 and the tactile feedback ball 83 are provided. The tactile feedback ball 83 can be protruded from or retracted in the accommodation hole 81. The tactile feedback ball 83 is always brought into contact with the corresponding tactile feedback piece 61 by the force of the tactile feedback coil spring 82.

As a result, when the shutter 12 is pressed to the bottom inner surface 11b of the shutter holder 11, each projection 65 is pressed into the corresponding engaging recess 39 by the force of the corresponding retaining spring 82 with the corresponding tactile feedback ball 83. Accordingly, the shutter holder 11 is engaged with the case main body 21 and held in this engaged state.

As a result, when inserted in the slot 23, the electromagnetic key 5 is held in the slot mechanism 1. When a user attempts to pull the electronic key 5 from the slot mechanism 1, if the user pulls the electronic key 5 by a force greater than the engagement force, the shutter holder 11, which is locking the electronic key 5, is moved. Accordingly, the state in which the shutter holder 11 is held by the case main body 21 and the state in which the electronic key 5 is locked to the shutter holder 11 are cancelled. This permits the electronic key 5 to be pulled out of the slot mechanism 1. After the electronic key 5 is pulled out, the shutter 12 closes the slot 23 again.

(5) The shutter holder 11 has the locking arm 74. The case main body 21 has the solenoid 75 located in the vicinity of the bottom inner surface 21a. The plunger 76 of the solenoid 75 projects and retracts in a direction perpendicular to the locking arm 74. When the plunger 76 is engaged with the notch 74a of the locking arm 74, the shutter holder 11 is locked to the case main body 21. This prevents the electronic key 5 from coming off the slot mechanism 1 and from being erroneously pulled out.

(6) The verification switch 104, which is provided in the case main body 21, is turned on as the shutter holder 11 contacts the switch 104 when the shutter holder 11 is moved to a position to engage with the case main body 21. When the verification switch 104 is turned on, the car microcomputer 101 generates an electromagnetic field. The electronic key 5 (the correct potable device), which is carried by the user of the vehicle, has the transponder 103. The transponder 103 outputs a transponder signal based on the electromagnetic field. The car microcomputer 101 verifies the ID code contained in the transponder signal against the ID code of the vehicle.

Therefore, when an object other than the electronic key 5, for example, a finger, is inserted in the slot 23, the ID verification performed by the car microcomputer 101 is not established. In this case, the plunger 76 stays retracted and the shutter holder 11 is not locked to the case main body 21. Therefore, even if an object other than the electronic key 5 is inserted in the slot mechanism 1 and then pulled out, the shutter 12 does not stay at the pressed position.

It should be apparent to those skilled in the art that the present invention may be embodied in many other specific forms without departing from the spirit or scope of the invention. Particularly, it should be understood that the invention may be embodied in the following forms.

In the illustrated embodiment, the case 10 of the slot mechanism 1 is shaped as a box. However, the case 10 may be shaped in other forms. For example, the case 10 may be cylindrical. The cross-sectional shape of the interior of the slot mechanism 1 may conform to the shape of the electromagnetic key 5. For example, the electronic key 5 may be cylindrical, and the cross-section of the slot mechanism 1 may be circular.

In the illustrated embodiment, the locking portion 49a of each locking piece 49 is guided by the corresponding operational surface 37 including the thin surface 37a, the thick surface 37b, and the inclined surface 37c, and is projected into the interior of the shutter holder 11. This configuration may be changed. For example, the electronic key 5 may be locked to the shutter holder 11 by electrically controlling the movement of the locking pieces 49.

In the illustrated embodiment, the tactile feedback pieces 61 are pivoted to cause the shutter holder 11 to be engaged with the case main body 21. However, the tactile feedback pieces 61 may be formed of a flexible material. In this case, when each tactile feedback piece 61 is pressed into the shutter 12, the tactile feedback piece 61 is pressed toward the operational surface 37 so that the shutter holder 11 is engaged with the case main body 21.

In the illustrated embodiments, the side of each engaging recesses 39 functions as the inclined surface 39a. However, the side of each projection 65 may function as an inclined surface.

In the illustrated embodiment, the electronic key 5 is locked to the slot mechanism 1 after the engine is started with the operation mechanism 91. That is, the plunger 76 is protruded so that the shutter holder 11 is locked to the case main body 21 after the start of the engine. This may be changed such that the electronic key 5 is locked to the slot mechanism 1 when the ID codes are verified by the car microcomputer 101.

In the illustrated embodiment, the plunger 76 of the solenoid 75 directly enters the notch 74a of the locking arm 74 so that the shutter holder 11 is locked to the case main body 21. However, the plunger 76 may be coupled to the locking lever with a cam. In this case, when the plunger 76 is projected, locking lever enters the notch 74a of the locking arm 74, so that the shutter holder 11 is locked.

Therefore, the present examples and embodiments are to be considered as illustrative and not restrictive and the invention is not to be limited to the details given herein, but may be modified within the scope and equivalence of the appended claims.

What is claimed is:

1. A slot mechanism having an accommodation space into which an insertion object is inserted through a slot, the slot mechanism comprising:
   a shutter holder provided in the accommodation space, wherein the shutter holder is movable between a first position and a second position along an insertion direction in which the insertion object is inserted into the accommodation space, and wherein the second position is closer to a bottom of the accommodation space than the first position;
   a shutter provided in a shutter space defined in the shutter holder, wherein the shutter is movable relative to the shutter holder and between a third position and a fourth position along the insertion direction, wherein the fourth position is closer to a bottom of the shutter space than the third position, wherein, when the insertion object is inserted into the accommodation space, the shutter is pressed by the insertion object and is moved to the fourth position, wherein the shutter holder is pressed by the shutter moved to the fourth position and is moved to the second position, wherein, when the insertion object is pulled out of the accommodation space, the shutter holder moves to the first position, and the shutter moves to the third position, so that the slot is closed by the shutter;
   an insertion object locking mechanism, wherein the locking mechanism locks the insertion object to the shutter holder when the shutter is moved to the fourth position by the insertion object; and
   a holder retaining mechanism, wherein the holder retaining mechanism holds the shutter holder at the second position when the shutter holder is moved to the second position by the shutter.

2. The slot mechanism according to claim 1, wherein, when the shutter holder receives a force that greater than a predetermined value and is directed from the second position to the first position, the retaining mechanism releases the shutter holder.

3. The slot mechanism according to claim 1, wherein the insertion object locking mechanism includes a locking piece that is movable with movement of the shutter holder, wherein, when the shutter is moved to the fourth position by the insertion object, and the shutter holder is moved to the second position by the shutter, the locking piece projects into the shutter space to engage with the insertion object.

4. The slot mechanism according to claim 3, further comprising a sidewall that faces the shutter holder with respect to a direction perpendicular to the insertion direction and defines the accommodation space, wherein the locking piece is urged toward the sidewall, wherein a step is formed in the sidewall, and wherein, when the shutter holder is moved from the first position to the second position, the step guides the locking piece to project into the shutter space.

5. The slot mechanism according to claim 1, further comprising a sidewall that faces the shutter holder with respect to a direction perpendicular to the insertion direction and defines the accommodation space, wherein the holder retaining mechanism includes an engaging recess formed in the sidewall and an engaging member provided in the shutter holder, wherein the engaging member has a projection projecting toward the sidewall, and wherein, when the shutter holder is moved to the second position by the shutter, the projection engages with the engaging recess.

6. The slot mechanism according to claim 5, wherein the holder retaining mechanism further includes a pressing member that presses the projection toward the sidewall, and wherein a force by which the pressing member presses the projection changes according to the position of the shutter relative to the shutter holder.

7. The slot mechanism according to claim 6, wherein the engaging member is rotatably supported by the shutter holder, and wherein the pressing member is provided in the shutter.

8. The slot mechanism according to claim 1, further comprising a holder locking mechanism, wherein the holder locking mechanism locks the shutter holder by a force greater than the retaining force of the holder retaining mechanism when the shutter holder is at the second position.

9. The slot mechanism according to claim 8, wherein the holder locking mechanism includes a holder locking member and a solenoid, wherein the holder locking member is provided in the shutter holder and has an engaging portion, and the solenoid has a plunger, and wherein, when the plunger is engaged with the engaging portion, the shutter holder is locked.

10. The slot mechanism according to claim 1, further comprising an elastic member for the shutter holder and an elastic member for the shutter, wherein the holder elastic member urges the shutter holder from the second position:to the first position, and wherein the shutter elastic member urges the shutter from the fourth position to the third position.

11. A smart ignition system, comprising:
   a portable device;
   a slot mechanism having an accommodation space into which the portable device is inserted through a slot;

a detection portion for detecting insertion of the portable device into the accommodation space; and a verification portion for determining whether the inserted portable device is a correct portable device;

wherein the slot mechanism includes:

a shutter holder provided in the accommodation space, wherein the shutter holder is movable between a first position and a second position along a direction in which the portable device is inserted into the accommodation space, and wherein the second position is closer to a bottom of the accommodation space than the first position;

a shutter provided in a shutter space defined in the shutter holder, wherein the shutter is movable relative to the shutter holder and between a third position and a fourth position along the insertion direction, wherein the fourth position is closer to a bottom of the shutter space than the third position, wherein, when the portable device is inserted into the accommodation space, the shutter is pressed by the portable device and is moved to the fourth position, wherein the shutter holder is pressed by the shutter moved to the fourth position and is moved to the second position, wherein, when the portable device is pulled out of the accommodation space, the shutter holder moves to the first position, and the shutter moves to the third position, so that the slot is closed by the shutter;

a portable device locking mechanism, wherein the locking mechanism locks the portable device to the shutter holder when the shutter is moved to the fourth position by the portable device; and a holder retaining mechanism, wherein the holder retaining mechanism holds the shutter holder at the second position when the shutter holder is moved to the second position by the shutter.

12. The smart ignition system according to claim 11, further comprising a holder locking mechanism, wherein, only when the inserted portable device is determined to be a correct portable device, the holder locking mechanism locks the shutter holder by a force greater than the retaining force of the holder retaining mechanism when the shutter holder is at the second position.

13. The smart ignition system according to claim 11, wherein the detection portion is a switch that is turned on when the shutter holder reaches the second position, and wherein the verification portion performs the determination after the switch is turned on.

14. The smart ignition system according to claim 11, wherein the portable device transmits a signal containing a unique ID code to the verification portion, and wherein the verification portion determines whether the ID code contained in the received signal is an ID code given to the correct portable device.

15. The smart ignition system according to claim 14, wherein the portable device includes a transponder, wherein, when the portable device is inserted in the accommodation space, the transponder outputs a transponder signal containing the ID code by receiving electromagnetic waves generated by the slot mechanism.

16. A slot mechanism for receiving an insertion object, comprising:

a case that has a slot and defines an accommodation space into which the insertion object is inserted through the slot;

a shutter holder provided in the accommodation space, wherein the shutter holder is movable between a first position and a second position along a direction in which the insertion object is inserted into the accommodation space, wherein the second position is closer to a bottom of the accommodation space than the first position;

a holder urging member for urging the shutter holder from the second position to the first position;

a shutter provided in a shutter space defined in the shutter holder, wherein the shutter is movable relative to the shutter holder and between a third position and a fourth position along the insertion direction, wherein the fourth position is closer to a bottom of the shutter space than the third position, wherein, when the insertion object is inserted into the accommodation space through the slot, the shutter is pressed by the insertion object and is moved to the fourth position, wherein the shutter holder is pressed by the shutter moved to the fourth position and is moved to the second position;

a shutter urging member for urging the shutter from the fourth position to the third position by a force weaker than that of the holder urging member;

an insertion object locking mechanism, wherein the locking mechanism locks the insertion object to the shutter holder when the shutter is moved to the fourth position by the insertion object; and a holder retaining mechanism, wherein the holder retaining mechanism holds the shutter holder at the second position when the shutter holder is moved to the second position by the shutter.

17. The slot mechanism according to claim 16, wherein, when the shutter holder receives a force that greater than a predetermined value and is directed from the second position to the first position, the retaining mechanism releases the shutter holder.

18. The slot mechanism according to claim 16, wherein the insertion object locking mechanism includes a locking piece that is movable with movement of the shutter holder, wherein, when the shutter is moved to the fourth position by the insertion object, and the shutter holder is moved to the second position by the shutter, the locking piece projects into the shutter space to engage with the insertion object.

19. The slot mechanism according to claim 16, further comprising a sidewall that faces the shutter holder with respect to a direction perpendicular to the insertion direction and defines the accommodation space, wherein the holder retaining mechanism includes an engaging recess formed in the sidewall and an engaging member provided in the shutter holder, wherein the engaging member has a projection projecting toward the sidewall, and wherein, when the shutter holder is moved to the second position by the shutter, the projection engages with the engaging recess.

20. The slot mechanism according to claim 16, further comprising a holder locking mechanism, wherein the holder locking mechanism locks the shutter holder by a force greater than the retaining force of the holder retaining mechanism when the shutter holder is at the second position.

* * * * *

UNITED STATES PATENT AND TRADEMARK OFFICE
CERTIFICATE OF CORRECTION

PATENT NO. : 6,803,675 B2
DATED : October 12, 2005
INVENTOR(S) : Shoichi Harada et al.

It is certified that error appears in the above-identified patent and that said Letters Patent is hereby corrected as shown below:

<u>Column 6,</u>
Line 24, delete "surface 1 ha of" and insert therefor -- surface 11a of --.

Signed and Sealed this

Fifth Day of April, 2005

JON W. DUDAS
*Director of the United States Patent and Trademark Office*